UNITED STATES PATENT OFFICE.

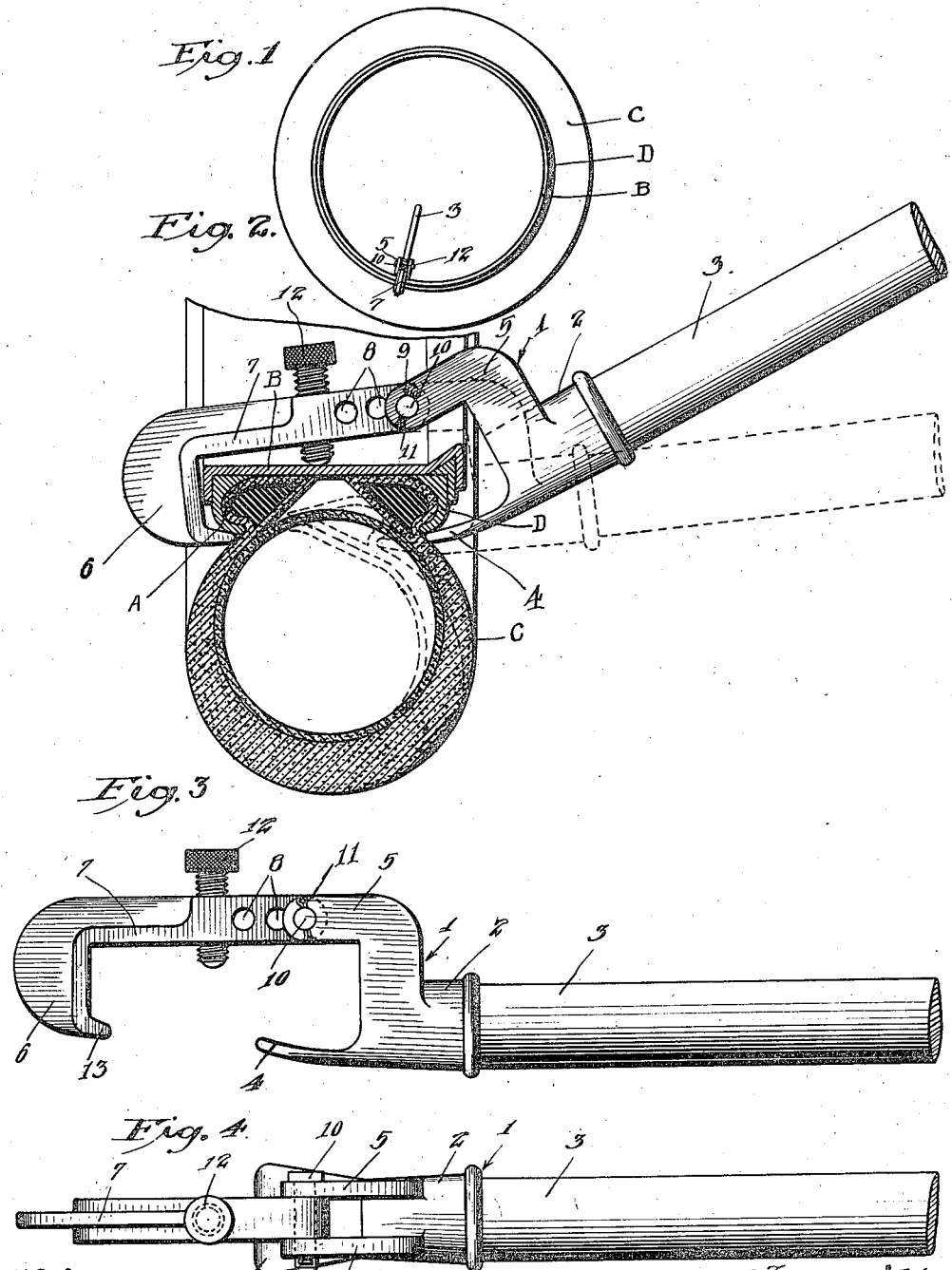

FRANK M. ADAMSON AND JAMES S. TORMEY, OF LOS ANGELES, CALIFORNIA.

TIRE-TOOL.

1,278,283.　　　　　　　Specification of Letters Patent.　　Patented Sept. 10, 1918.

Application filed March 6, 1917. Serial No. 152,693.

*To all whom it may concern:*

Be it known that we, FRANK M. ADAMSON and JAMES S. TORMEY, both citizens of the United States, residing at Los Angeles, in the county of Los Angeles and State of California, have invented a new and useful Tire-Tool, of which the following is a specification.

This invention relates to a tool for facilitating the removal of pneumatic tires from rims therefor.

Pneumatic tires when held upon rims for a considerable length of time stick or "freeze" to the rim or parts thereof to such an extent that their removal with the ordinary tools employed is extremely difficult and consumes a great deal of time. It is therefore the primary object of the invention to provide a tire tool of simple and light construction which may be quickly operated to loosen a tire relative to a rim without possibility of injury to the tire and so that the tire may be quickly removed from the rim.

Another object of the invention is to provide a tool of the character described which may be adjusted so as to operate in conjunction with tires of different sizes.

Another object is to provide a tire tool of the character described which includes tire engaging means adapted for engagement with opposite sides of a tire adjacent to the beads thereof, there being provided an adjustment for regulating the position of the tire engaging means relative to the beads, so that an effective loosening of the tire relative to the rim may be obtained, and the tool is therefore adapted for use in connection with tires of various sizes.

The accompanying drawings illustrate the invention:

Figure 1 is a side elevation of a tire and rim showing the tool in position for loosening the tire.

Fig. 2 is an enlarged side elevation of the tool showing it mounted upon a tire and rim with the tire and rim in section.

Fig. 3 is an enlarged side elevation of the tool removed from the tire; and

Fig. 4 is a top plan view of the tool.

Referring to the drawings by characters of reference, 1 designates a body portion of the device which is preferably in the form of a casting and comprises a tubular handle socket 2 receiving a handle 3, an outwardly extending flat tire engaging jaw 4 formed integral with the body portion and extending substantially in line with the handle, and substantial L-shaped and opposed ears 5 extending outwardly at right-angles from the socket 2 and then substantially parallel to the socket and jaw 4. The jaw 4 and ears 5 together form a U-shaped member.

A tire engaging hook 6 having a shank 7 extending at right angles thereto is connected with the ears 5. The hook 6 is L-shaped. The shank 7 is provided with a series of openings 8 adjacent to its free end, said free end being located between the ears 5. The ears are provided with alined openings 9 in the ends thereof which are adapted to register with certain of the openings 8 in the shank 7. A headed pin 10 is inserted through the openings 9 and one of the openings 8 to secure the hook 6 to the body portion 1 and a cotter pin 11 is inserted through the unheaded end of the pin 10 to hold the pin in place.

As a means for regulating the position of the hook 6 and jaw 4 relative to the tire, there is provided a set screw 12 intermediate the ends of the shank 7, said set screw being adapted to engage the inner face of the tire rim, as shown in Fig. 2 of the drawings.

To loosen a tire from the rim the hook 6 is placed over one side of the rim. The end portion 13 of the hook rests in engagement with the upper side of the curved tire clamping member A of the rim B and in engagement with the tire C. The set screw 12 is adjusted so as to permit the hook to assume this relation to the tire and rim when hooked over one side of the rim, as shown in Fig. 2 of the drawings. When the hook 6 is in position shown in Fig. 2 of the drawings, the jaw 4 may be brought to bear upon the opposite side of the tire at a point just above the bead ring D of the rim and downward pressure upon the handle 3 forces the jaw 4 inwardly and pushes the side of the tire engaged by the jaw inwardly, as shown in dotted lines in Fig. 2. It will be seen that the device rests loosely upon the rim and by turning the tire and rim around while holding the tool in the position shown in Fig. 2 of the drawings in full lines, the handle may be depressed at suitable points around the tire so as to cause the tire to be thoroughly loosened relative to the rim. After the tire has been loosened with the tool in the manner hereinbefore described, it may be removed from the rim in the ordinary manner with little inconvenience and less time than is required with the use of the ordinary tools. The device may be adapted for tires of different sizes by changing the connection of the shank 7 of the hook 6 relative to the ears 5 of the body portion 1. This change of connection is provided by the series of openings formed in the shank and the removable pin 10 previously described.

With reference to the foregoing description and accompanying drawings, it will be seen that we have provided a tire tool which is exceptionally simple in construction, easy to operate and will prove an effective time and labor saving device. Another advantage derived from the use of the tool is that possibility of injury to the tire such as often occurs when employing the ordinary methods and tools in removing a tire from the rim is eliminated.

Aside from the use of the invention in connection with the removal of tires from rims, the tool may be used in various ways for facilitating the placing of tires upon rims. In this connection, for example, the tool may be used to hold the side of a tire being mounted upon a demountable Q. D. rim so that the bead ring and locking ring may be quickly hammered or otherwise moved into place.

The tool may be used to loosen bead rings which become stuck or frozen, for example, the ring B, shown in the drawings, may be loosened by turning the set screw 12 so as to allow the jaw 4 to come into contact with the ring and forcing the handle 3 downwardly to push the ring inwardly and loosen it. After the ring D has been loosened the locking ring may be readily moved. The jaw 4 is slightly curved toward the shank of the hook. This curvature permits the jaw to be placed in as close engagement as possible to the bead of the tire and causes the jaw to be moved inwardly toward the bead during the loosening operation, as opposed to being moved outwardly away from the bead and into engagement with the thinner part of the tire as is the case in using the ordinary well-known tools.

We claim:

1. A tire tool comprising a handle receiving member, a flat tire engaging jaw integral with the handle receiving member and extending substantially in line with the handle, L-shaped ears extending at right angles from the handle-receiving member and then substantially parallel to the tire engaging jaw, and a tire engaging hook pivoted between the L-shaped ears.

2. A tire tool comprising a handle receiving member, a flat tire engaging jaw integral with the handle receiving member and extending substantially in line with the handle, L-shaped ears extending at right angles from the handle-receiving member and then substantially parallel to the tire engaging jaw, a tire engaging hook pivoted between the L-shaped ears, and a screw extending through the hook and having its point projecting inward.

3. A tire tool comprising a U-shaped member, and an L-shaped member pivoted to one arm of the U-shaped member so as to bring its free end in opposition to the other arm of the U-shaped member.

4. A tire tool comprising a U-shaped member, and an L-shaped member pivoted to one arm of the U-shaped member so as to bring its free end in opposition to the other arm of the U-shaped member, said other arm of the U-shaped member being inclined toward the pivot.

In testimony whereof, we have hereunto set our hands at Los Angeles, California, this 19th day of February, 1917.

FRANK M. ADAMSON.
JAMES S. TORMEY.

In presence of—
CHAS. J. CHUNN,
L. BELLE WEAVER.